United States Patent [19]
Kato et al.

[11] Patent Number: 5,963,700
[45] Date of Patent: Oct. 5, 1999

[54] OPTICAL FIBER

[75] Inventors: Masao Kato; Kenji Kurokawa; Tuneo Horiguchi; Yoshiaki Miyajima, all of Tokyo, Japan

[73] Assignee: Nippon Telegraph and Telephone Corporation, Tokyo, Japan

[21] Appl. No.: 09/030,750

[22] Filed: Feb. 25, 1998

[30] Foreign Application Priority Data

Feb. 26, 1997 [JP] Japan .................................. 9-042260

[51] Int. Cl.$^6$ .................................................. G02B 6/02
[52] U.S. Cl. .......................... 385/127; 385/124; 385/126
[58] Field of Search ..................................... 385/122–128

[56] References Cited

U.S. PATENT DOCUMENTS

| | | | |
|---|---|---|---|
| 4,436,368 | 3/1984 | Keck | 385/126 |
| 4,447,127 | 5/1984 | Cohen et al. | 385/126 |

FOREIGN PATENT DOCUMENTS

| | | |
|---|---|---|
| 52-114337 | 9/1977 | Japan . |
| 58-52603 | 3/1983 | Japan . |
| 62-165608 | 7/1987 | Japan . |
| 62-215207 | 9/1987 | Japan . |
| 7-209539 | 8/1995 | Japan . |
| 8-248251 | 9/1996 | Japan . |

OTHER PUBLICATIONS

"New Dispersion Shifted Fiber with Effective Area Larger Than 90 $\mu m^2$" by P.Nouchi et al., ECOC +96, Sep. 1996.

"Large effective area dispersion–shifted fibers with dual–ring index profiles" by Y.Liu et al., OFC'96 Technical Digest pp. 165–166.

"Single–Mode Dispersion–Shifted Fibers with Large Effective Area for Amplified Systems" PD2–9 by Y.Liu et al., 100C95, pp. 36–38.

"Transmission Characteristics of a Coaxial Optical Fiber Line" by S.F.Mahmoud et al., Journal of Lightwave Technology vol. 11 No. 11 Nov. 1996 PP1717–1720.

"Nonlinear Kerr Coefficient Measurement for Dispersion Shifted Fibers using Self–Phase Modulation Method; 1.55$\mu$" by Y.Namihar et al., Fifth Opt Electronics Conference (OEC'94) Technical Digest Jul. 1994 Makuhari Messe pp. 136–137.

"Optics and Photonics" by G.P.Agrawal Nonlinear Fiber Optics 1989.

*Primary Examiner*—Phan Palmer
*Attorney, Agent, or Firm*—Blakely Sokoloff Taylor & Zafman

[57] ABSTRACT

An optical fiber includes a core, a first cladding, a second cladding, and a third cladding. The core has a refractive index $n_0$. The first cladding is formed around the core and has a refractive index $n_1$. The second cladding is formed around the first cladding and has a refractive index $n_2$. The third cladding is formed around the second cladding and has a refractive index $n_3$. The refractive indices have relationships $n_1 > n_2 > n_3$ and $n_1 > n_0$.

17 Claims, 12 Drawing Sheets

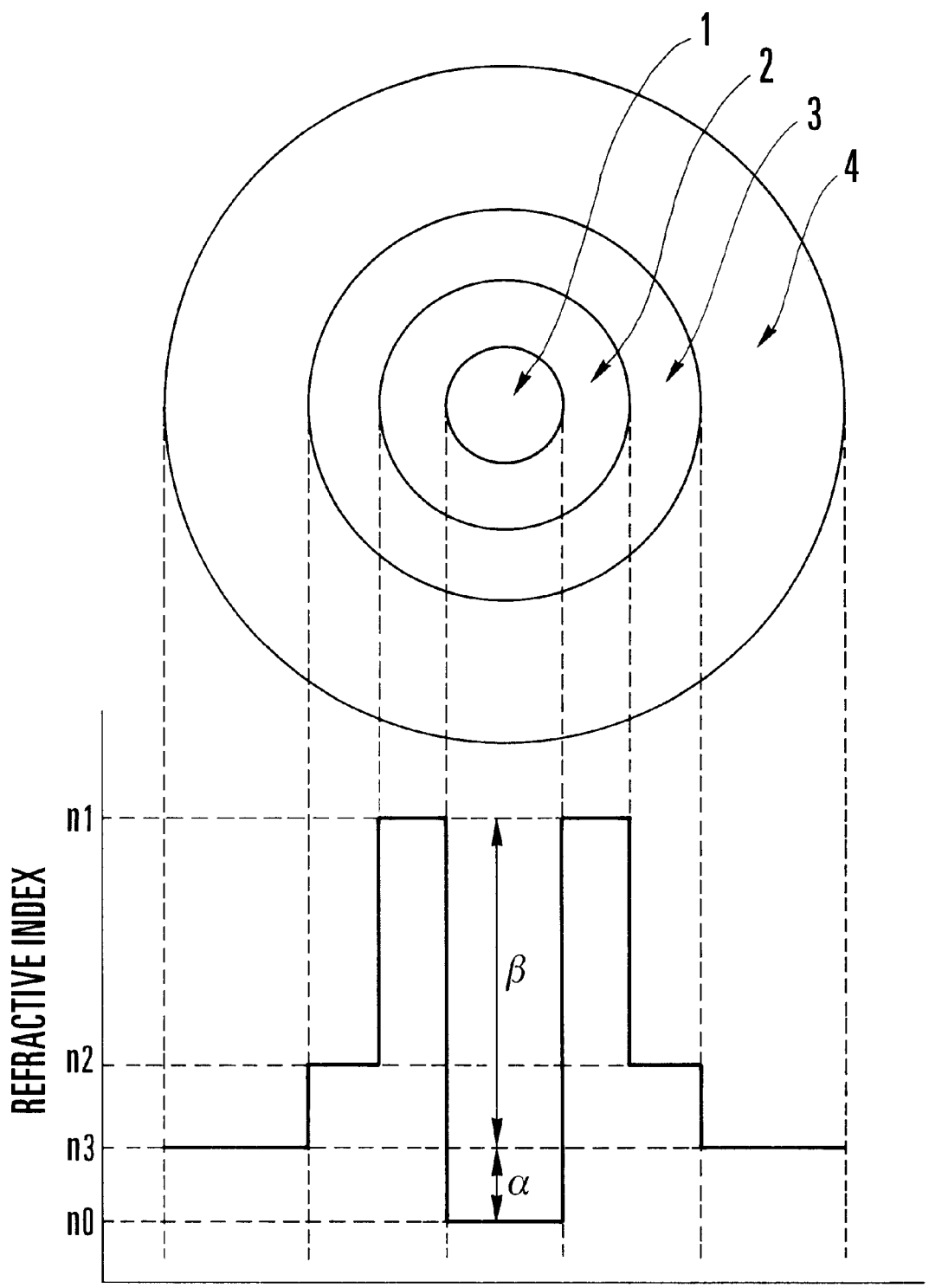
F I G. 1

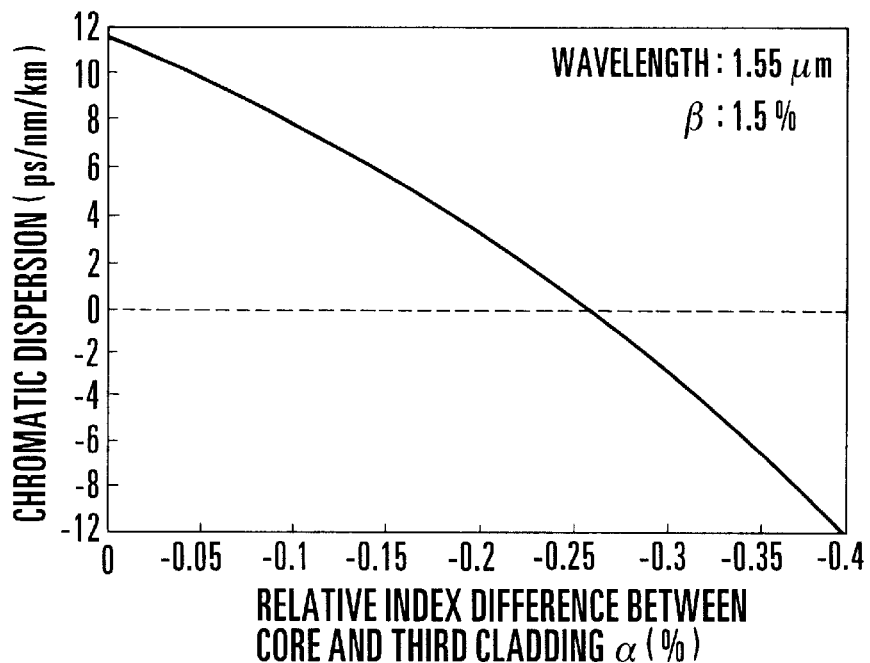
F I G. 2
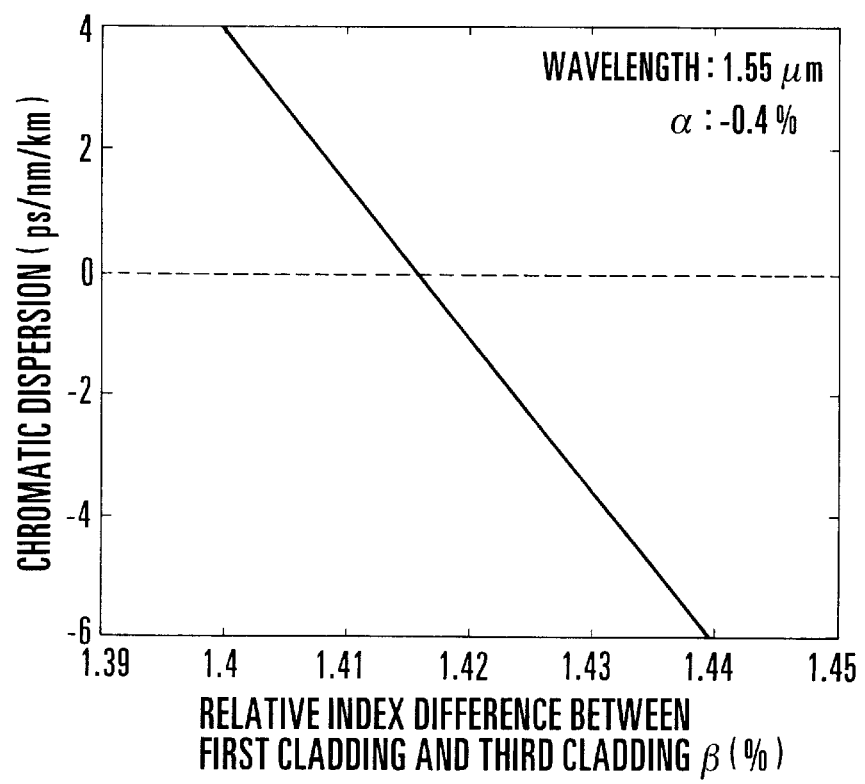
F I G. 3

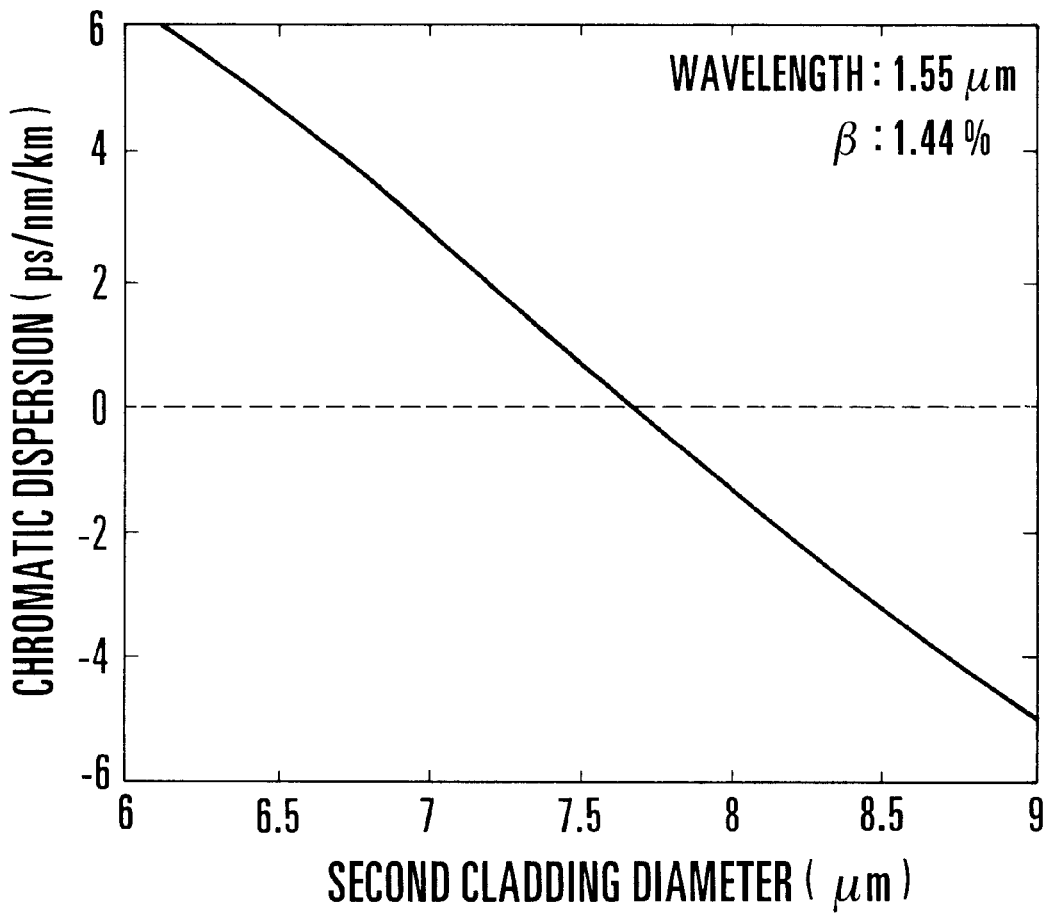
F I G. 4

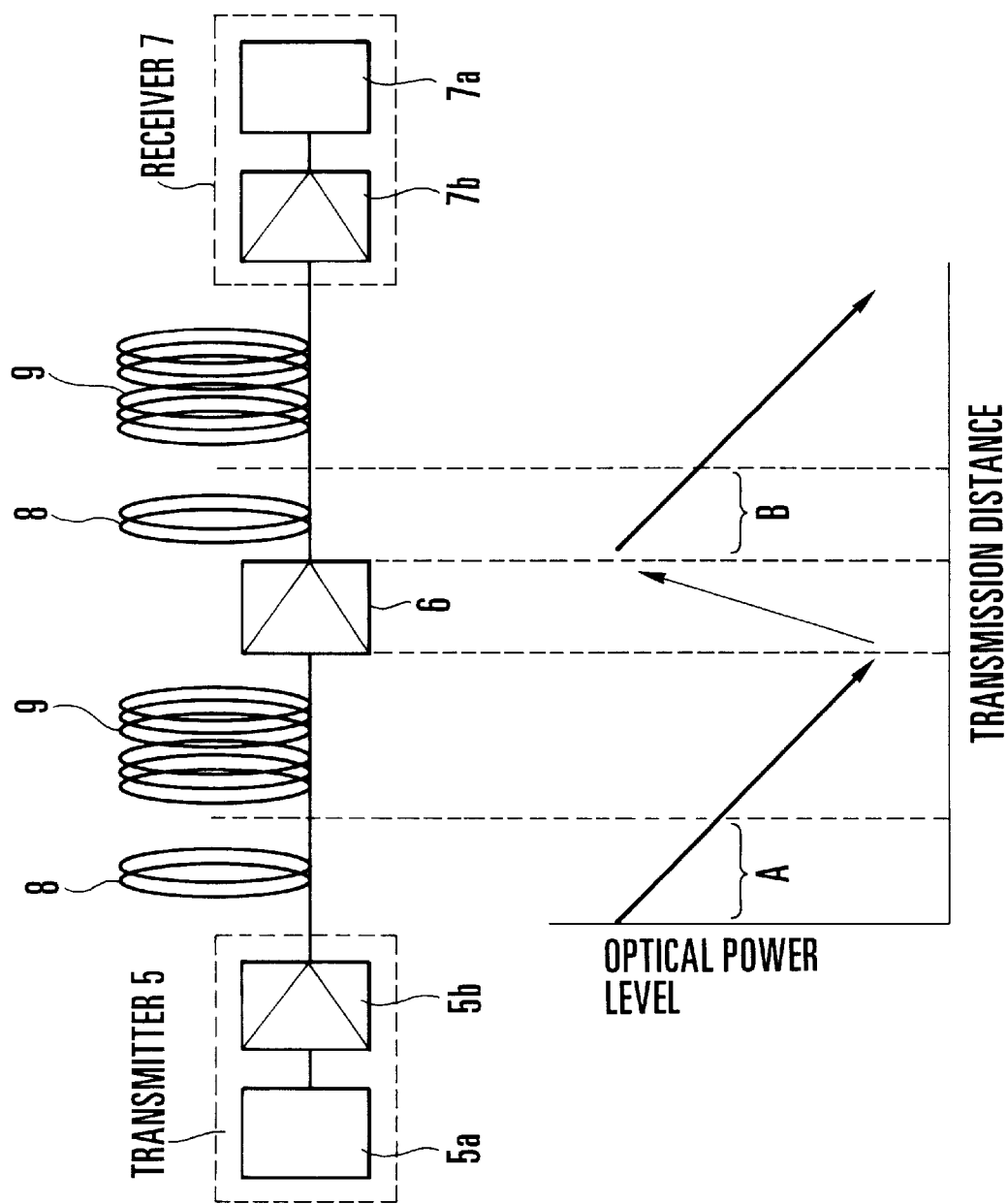

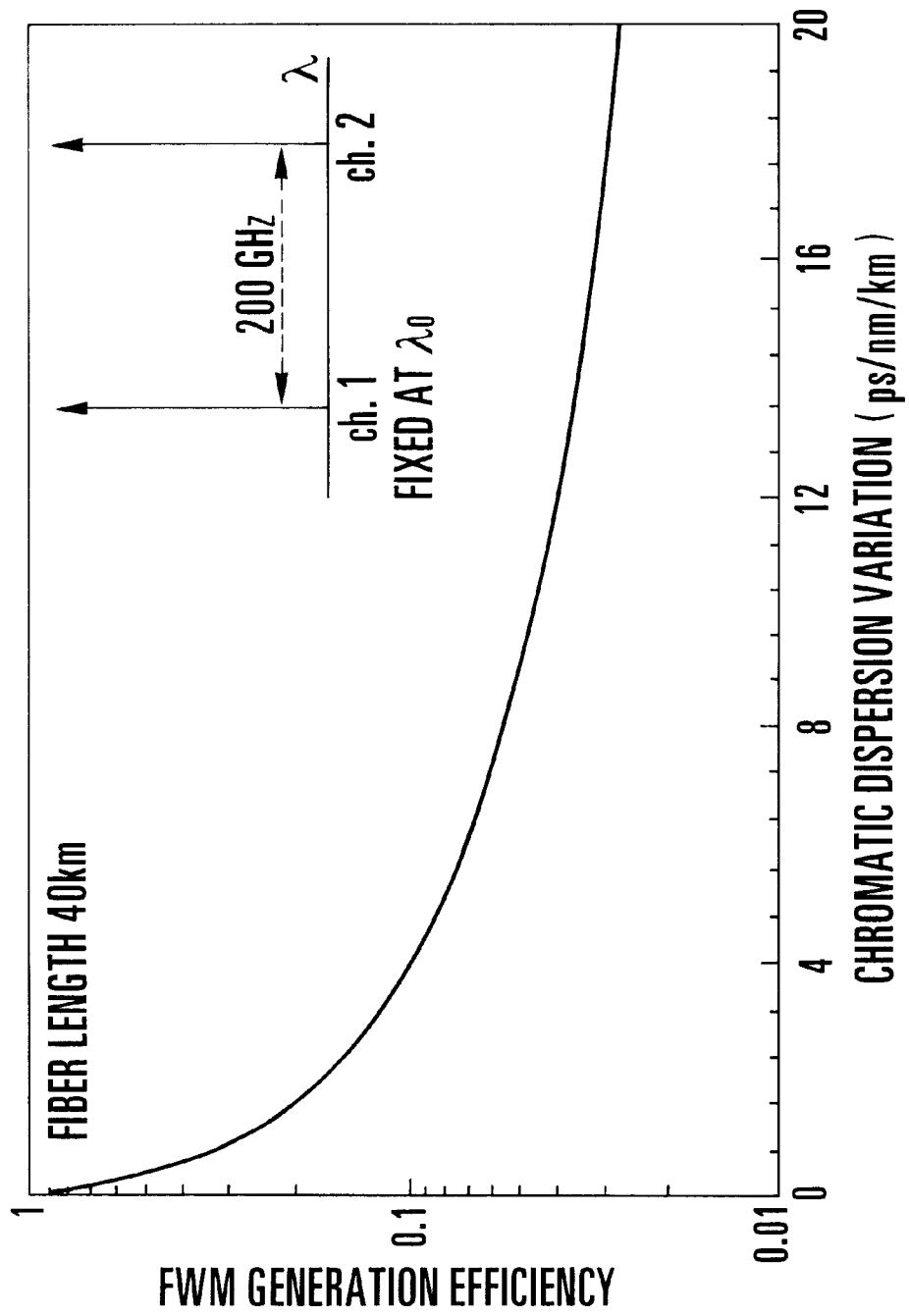
F I G. 10

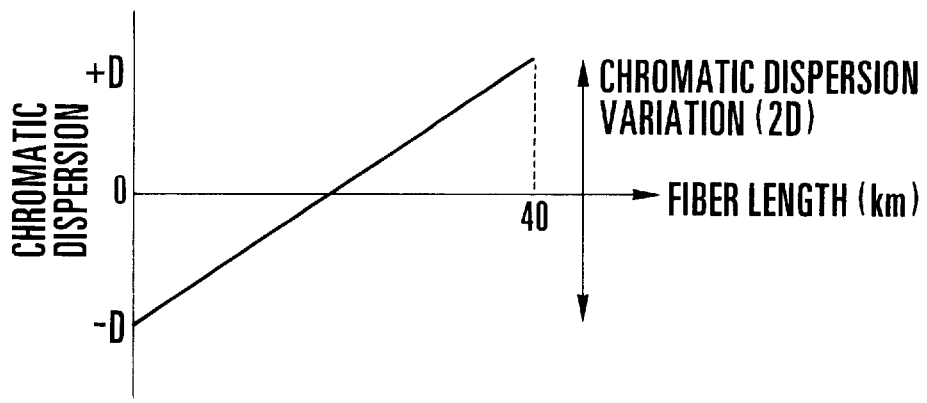
F I G. 11
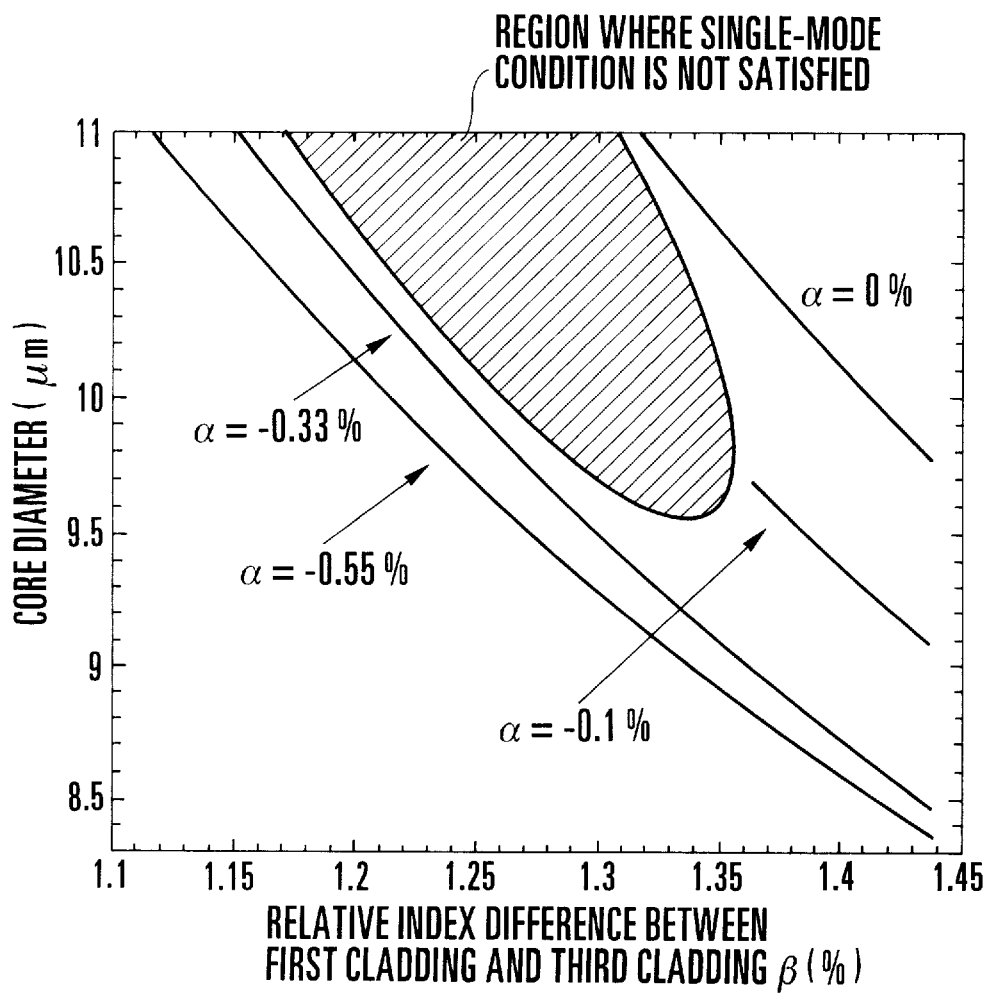
F I G. 12

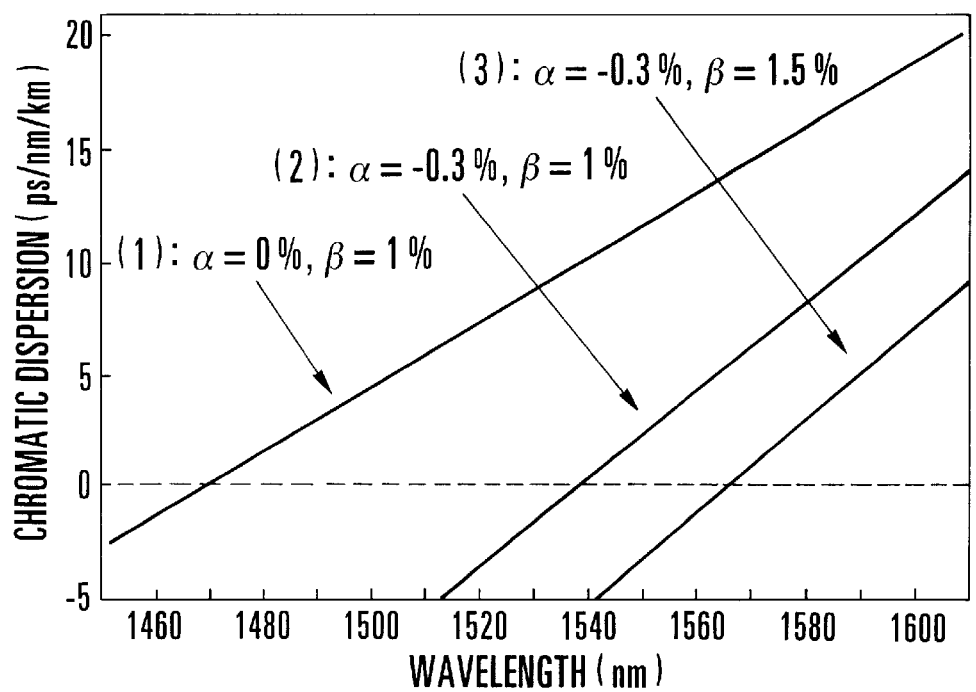
F I G. 14
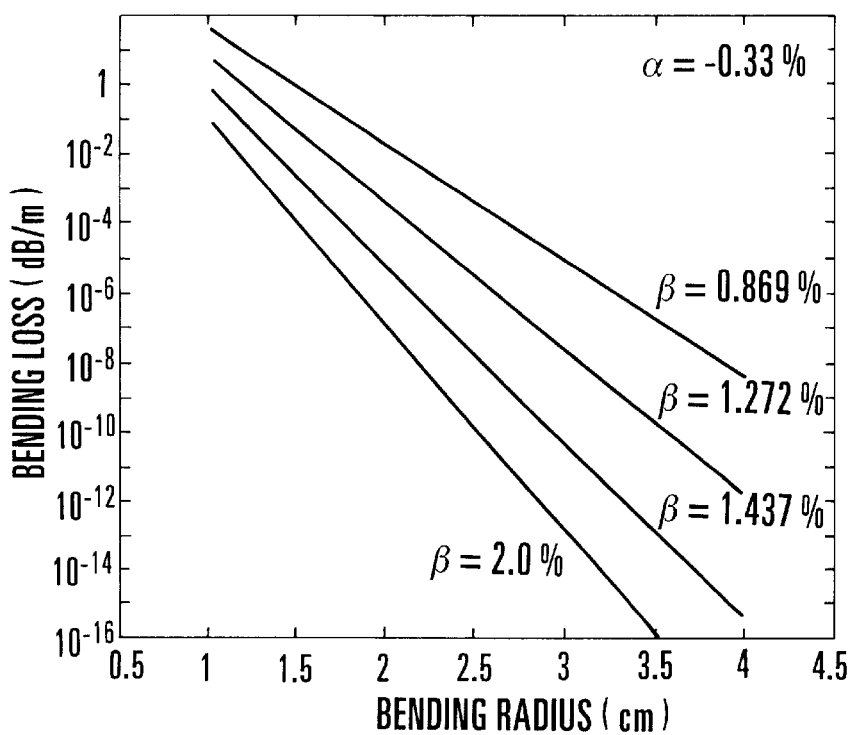
F I G. 15

OPTICAL FIBER

BACKGROUND OF THE INVENTION

The present invention relates to an optical fiber.

A silica-based single-mode optical fiber (to be referred to as an SMF (Single-Mode Fiber) hereinafter) which is generally used in optical communication has a wavelength band for giving the minimum transmission loss within the range of 1.4 to 1.6 μm. Such a wavelength band is preferably used for long-distance optical communication. However, when an optical signal having the minimum transmission loss wavelength propagates through the SMF, the waveform degrades due to chromatic dispersion, resulting in limitations on the bit rate and the transmission distance.

The chromatic dispersion in such an optical fiber is given by both material dispersion and waveguide dispersion. For example, in a conventional SMF having a core diameter of 10 μm, whose relative index difference Δ between the core and cladding is 0.3%, material dispersion is more dominant than waveguide dispersion. Since the chromatic dispersion of silica used as a material is reflected to result in a zero-dispersion wavelength in the 1.3-μm band, the SMF used in a wavelength band of 1.5 μm of large-capacity optical communication has a chromatic dispersion of about +17 ps/nm/km.

Note that "+17 ps/nm/km" means that when an optical pulse having a spectral width of 1 nm (FWHM) propagates in a 1-km long optical fiber, the pulse width broadens by about 17 ps ("Nonlinear Fiber Optics", Govind P. Agrawal, p. 63 (Dispersion-induced Pulse Broadening), Academic Press).

Conventionally, demand has arisen for a technique of reducing the limitation on transmission capacity due to chromatic dispersion to increase the bit rate and transmission distance. To meet this requirement, an optical fiber called a dispersion shifted fiber (to be referred to as a DSF (Dispersion Shifted Fiber) hereinafter) has already been developed as an optical fiber having minimum chromatic dispersion in a communication wavelength band of 1.5 μm (Nobuo K. et al., "Characteristics of dispersion-shifted dual shape core single-mode fibers", J.L.T., LT-5, No. 6, p. 792 (1987)).

In this DSF, the index distribution of the core and cladding is designed such that waveguide dispersion has an opposite sign to that of material dispersion but the same absolute value. The zero-dispersion wavelength is set within the 1.5-μm band. To satisfy these conditions, the relative index difference Δ between the core and cladding is set to be 0.7% or more, i.e., the waveguide dispersion is made large. However, when the relative index difference Δ is large, the core diameter must be small to satisfy the single-mode condition (to be described later). Consequently, the field distribution of light becomes narrow, and the effective core area (to be referred to as an Aeff hereinafter) is smaller than that of the SMF.

The single-mode condition will be described. In case of a step-index fiber, letting λ be the wavelength to be used, a normalized frequency V at the wavelength to be used is given by:

$$V\Delta = (2\pi/\lambda) \cdot a \cdot n_1 (2\Delta)^{0.5} \quad (1)$$

$$\Delta = (n_1 - n_2)/n_1 \quad (2)$$

where a is the core diameter, $n_1$ is the refractive index of the core, $n_2$ is the refractive index of the cladding, and Δ is the relative index difference between the core and cladding. To satisfy the single-mode condition, the value of the frequency V must be 2.405 or less.

When the relative index difference Δ is increased to make the waveguide dispersion large, the core diameter a must be designed to be small instead. However, when the core diameter a is reduced to increase the relative index difference Δ, the light confinement effect in the core increases. The Aeff becomes smaller than that of the SMF, and additionally, the bending loss decreases.

A transmission system with a regenerative repeater spacing of 320 km and a bit rate of 10 Gb/s has already been put into practical use by applying the DSF (Dispersion Shifted Fiber) to the transmission line and an erbium-doped optical fiber amplifier (to be referred to as an EDFA hereinafter) to the repeater device.

As a technique of increasing the transmission capacity, wavelength division multiplexing (to be referred to as WDM hereinafter) has conventionally received a great deal of attention domestically and internationally. With the WDM, a plurality of signal wavelengths can be simultaneously used in one communication optical fiber. This realizes a transmission system having a larger capacity than that of the conventional single wavelength transmission.

As described above, when the DSF is used as the transmission line, the intensity of light in the optical fiber (i.e., optical power per unit area of the fiber section) becomes high because of the small Aeff. On the other hand, along with the increase in intensity of signal light, phenomena called optical nonlinear effects are likely to take place in the optical fiber in general. Especially, the effects are easily induced in the DSF having a high intensity of light.

The optical nonlinear effect which decreases the S/N ratio is a serious problem because it imposes considerable limitations on the bit rate and transmission distance of the transmission system using the DSF. Therefore, an actual transmission system using the DSF must transmit signals while suppressing the gain of the optical amplifier.

However, as the bit rate rises, the time slot per signal bit becomes short. To ensure the received power level, signal power per bit must be increased. This does not agree with suppression of optical nonlinear effects. To suppress the optical nonlinear effects, transmission power must be reduced to limit the bit rate.

When the WDM is employed to increase the transmission capacity, optical nonlinear effects called four-wave mixing (to be referred to as FWM hereinafter) are induced because of presence of a plurality of wavelengths in the optical fiber, so the bit rate and transmission distance are limited.

In the FWM, the third-order nonlinear optical process causes interference between signal wavelengths to generate new light. As the phase matching condition between wavelengths is satisfied, the FWM generation efficiency increases. For this reason, the FWM is more likely to take place when the signal wavelengths are closer to the zero-dispersion wavelength, and the interval between signal wavelengths is smaller. In the DSF whose zero-dispersion wavelength is within the signal wavelength band, the FWM is more likely to be induced than in the SMF, so the interval between signal wavelengths must be increased. However, since the amplification bandwidth of the EDFA is about several ten nm, a large wavelength interval decreases the number of signal channels to limit the transmission capacity.

The application purpose of the DSF is not limited to the transmission line.

For the further improvement of the transmission system, extensive studies on a high-speed optical switch and wavelength conversion device have also been made. The optical switch and wavelength conversion device perform switching or wavelength conversion using the optical nonlinear effects, unlike the transmission line, so how to induce the optical nonlinear effects is the important problem.

An optical switch and wavelength conversion device which are realized using the DSF in which the optical nonlinear effects readily occur because of the small Aeff have already been reported.

However, at a bit rate of 20 Gb/s or more, electrical signal processing cannot be used, and instead, the optical switch or wavelength conversion device must be used. The DSF to be used for the optical switch or wavelength conversion device must have a length of several ten km because the conversion efficiency is low. In addition, input optical power is required.

SUMMARY OF THE INVENTION

It is, therefore, a principal object of the present invention to provide an optical fiber allowing easy design of suppression and enhancement of optical nonlinear effects.

It is another object of the present invention to provide an optical fiber capable of suppressing optical nonlinear effects by lowering the intensity of light in the optical fiber, and suppressing FWM by disturbing the phase matching condition between wavelengths.

It is still another object of the present invention to provide an optical fiber capable of enhancing optical nonlinear effects by increasing the intensity of light in the optical fiber.

In order to achieve the above objects of the present invention, there is provided an optical fiber comprising a core having a refractive index $n_0$, a first cladding formed around the core and having a refractive index $n_1$, a second cladding formed around the first cladding and having a refractive index $n_2$, and a third cladding formed around the second cladding and having a refractive index $n_3$, wherein the refractive indices have relationships $n_1 > n_2 > n_3$ and $n_1 > n_0$.

With this arrangement, an optical fiber capable of suppressing or enhancing the optical nonlinear effects can be provided. An optical fiber for suppressing the optical nonlinear effects can be used for a transmission line. An optical fiber for inducing the optical nonlinear effects can be used for an optical switch or wavelength conversion device.

BRIEF DESCRIPTION OF THE DRAWINGS

FIG. 1 is a view showing the section of an optical nonlinearity suppressing fiber according to the present invention and its index distribution;

FIG. 2 is a graph showing the relationship between chromatic dispersion and a relative index difference α bet n a core and a third cladding;

FIG. 3 is a graph showing the relationship between chromatic dispersion and a relative index difference β between a first cladding and the third cladding;

FIG. 4 is a graph showing the relationship between the second cladding diameter and chromatic dispersion;

FIG. 6 is a view showing the arrangement of a transmission line using the optical nonlinearity suppressing fiber shown in FIG. 1 and the relationship between the transmission distance and the optical power level;

FIG. 10 is a graph showing the relationship between the chromatic dispersion variation and the FWM generation efficiency;

FIG. 11 is a graph showing the relationship between the fiber length and chromatic dispersion;

FIG. 12 is a graph showing the relationship between the core diameter and the relative index difference β between the first cladding and the third cladding;

FIG. 14 is a graph showing the relationship between the wavelength and chromatic dispersion; and FIG. 15 is a graph showing the relationship between the bending radius and the bending loss.

DETAILED DESCRIPTION OF THE PREFERRED EMBODIMENT

Figure 5A:
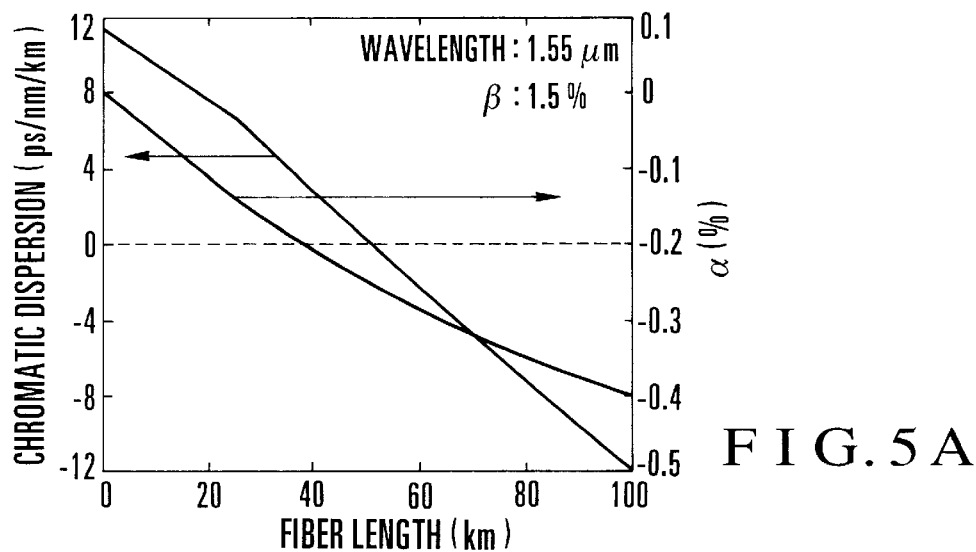
FIGS. 5A, 5B, and 5C are graphs showing the relationships between the fiber length and chromatic dispersion.

An embodiment of the present invention will be described next with reference to the accompanying drawings.

First, an optical fiber (to be referred to as an optical nonlinearity suppressing fiber hereinafter) which can be used for a transmission line by suppressing optical nonlinear effects will be described.

FIG. 1 shows the section of the optical nonlinearity suppressing fiber and its index distribution. As shown in FIG. 1, to suppress the optical nonlinear effects, the refractive index at the core center of a DSF is lowered. More specifically, the optical fiber of this embodiment is formed from a core 1 having a refractive index $n_0$, a cladding 2 (to be referred to as a first cladding hereinafter) having a refractive index $n_1$, a cladding 3 (to be referred to as a second cladding hereinafter) having a refractive index $n_2$, and a cladding 4 (to be referred to as a third cladding hereinafter) having a refractive index $n_3$, and the refractive indices have at least relationships $n_1 > n_2 > n_3$ and $n_1 > n_0$. Especially, in this case, to suppress the optical nonlinear effects, the refractive indices are set such that a relationship $n_1 > n_2 > n_3 \geq n_0$ is established. With this arrangement, the first cladding effectively functions as a core. The field distribution of light spreads in the radial direction of the optical fiber to increase the Aeff, so the optical nonlinear effects can be suppressed.

Such an optical nonlinearity suppressing fiber is made of the same material (e.g., silica) as that of the conventional optical fiber although the intensity of light lowers, so the optical nonlinearity suppressing fiber can be spliced to the conventional transmission line. Therefore, optical power in the transmission line can be increased, and simultaneously, degradation in transmission due to the optical nonlinear effects can be suppressed by inserting this fiber immediately after the optical amplifier in which the optical nonlinear effects readily occur.

However, as described above, when WDM is employed to increase the transmission capacity, optical nonlinear effects called FWM take place because of presence of a plurality of wavelengths in the optical fiber, resulting in limitations on the bit rate and transmission distance.

The FWM is suppressed by varying chromatic dispersion of the optical fiber along the longitudinal direction. More specifically, when chromatic dispersion varies along the longitudinal direction of the optical fiber, phase velocity of light locally changes in the transmission line. For this reason, in WDM transmission, the phase matching condition between adjacent channels is disturbed, so FWM as a limitation factor on transmission can be suppressed.

Some methods are available to vary chromatic dispersion. For example, when a relative index difference α between the core and the third cladding is continuously changed along the longitudinal direction in the manufacture of the optical fiber, chromatic dispersion at 1.55 μm can be continuously varied.

FIG. 2 shows a change in chromatic dispersion at 1.55 μm when the relative index difference α between the core and third cladding of the optical fiber shown in FIG. 1 is changed. A relative index difference β between the first and third claddings is 1.5%.

The relative index difference α is given by:

$$\alpha = (n_0 - n_3)/n_0$$

The relative index difference β is given by:

$$\beta = (n_1 - n_3)/n_1$$

The optical fiber shown in FIG. 2, whose chromatic dispersion varies from +12 ps/nm/km to −12 ps/nm/km (chromatic dispersion variation: 24 ps/nm/km), is merely an example for explaining the chromatic dispersion variation obtained upon changing the relative index difference α from, e.g., 0% to −0.4%, so the chromatic dispersion value need not always be ±12 ps/nm/km.

Even when the relative index difference β between the first cladding and the third cladding is changed, chromatic dispersion at 1.55 μm can be continuously changed. FIG. 3 shows a change in chromatic dispersion at 1.55 μm observed upon changing the relative index difference β. The relative index difference α is −0.4%.

The chromatic dispersion can also be varied by changing the second cladding diameter along the longitudinal direction of the optical fiber. FIG. 4 shows a change in chromatic dispersion at 1.55 μm observed upon changing the second cladding diameter. The relative index difference α is −0.4%, and the relative index difference β is 1.44%.

Figure 5B:
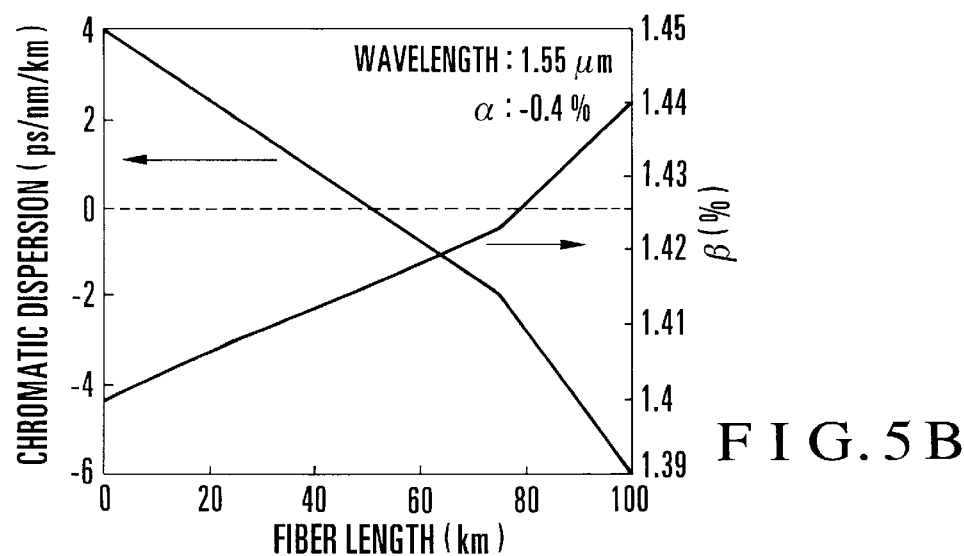
Figure 5C:
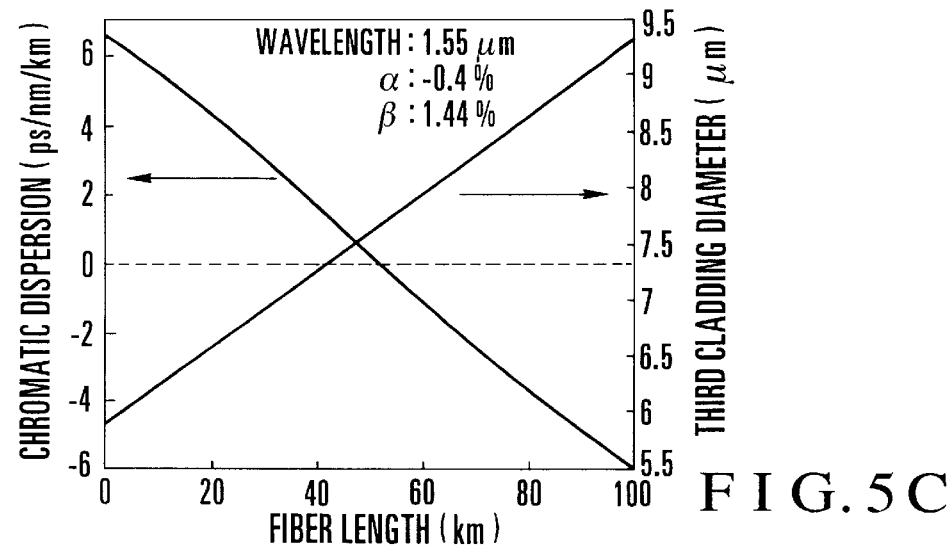

FIGS. 5A to 5C show the relationships between the fiber length and chromatic dispersion obtained when the relative index differences α and β and the second cladding diameter are changed. In FIG. 5A, the wavelength is 1.55 μm, and the relative index difference β is 1.5%. In FIG. 5B, the wavelength is 1.55 μm, and the relative index difference α is −0.4%. In FIG. 5C, the wavelength is 1.55 μm, the relative index difference α is −0.4%, and the relative index difference β is 1.44%.

In all cases, chromatic dispersion continuously lowers as the fiber length increases, and the chromatic dispersion changes depending on the position in the optical fiber, as is apparent from FIGS. 5A to 5C. Alternatively, the phase matching condition may be disturbed to suppress FWM by periodically changing both the relative index difference α between the core and third cladding and the relative index difference β between the first and third claddings along the longitudinal direction in the manufacture of the optical fiber.

The above-described optical nonlinearity suppressing fiber may be used in the following manner.

FIG. 6 shows the arrangement of the transmission line using the optical fiber shown in FIG. 1 and the relationship between the transmission distance and optical power level. As shown in FIG. 6, a transmitter 5 comprises a light source 5a and an optical amplifier 5b. A receiver 7 comprises a detector 7a and an optical amplifier 7b. An optical amplifier 6 is inserted between the transmitter 5 and the receiver 7. The transmitter 5 and the receiver 7 are connected through the optical amplifier 6, an optical nonlinearity suppressing fiber 8, and a conventional optical fiber 9.

This arrangement is based on the following reason. An actual optical fiber always has a transmission loss, optical power of an optical signal gradually becomes small during transmission. That is, the optical nonlinear effects are most conspicuous at positions (A and B in FIG. 6) immediately after optical amplifiers in the optical fiber transmission line. Therefore, when the optical nonlinearity suppressing fiber shown in FIG. 1 is inserted immediately after the optical amplifier in the conventional transmission line, the optical nonlinear effects can be effectively suppressed.

An optical fiber (to be referred to as an optical nonlinearity enhancing fiber hereinafter) which can be used for an optical switch or wavelength conversion device by inducing the optical nonlinear effects will be described next.

Figure 7:
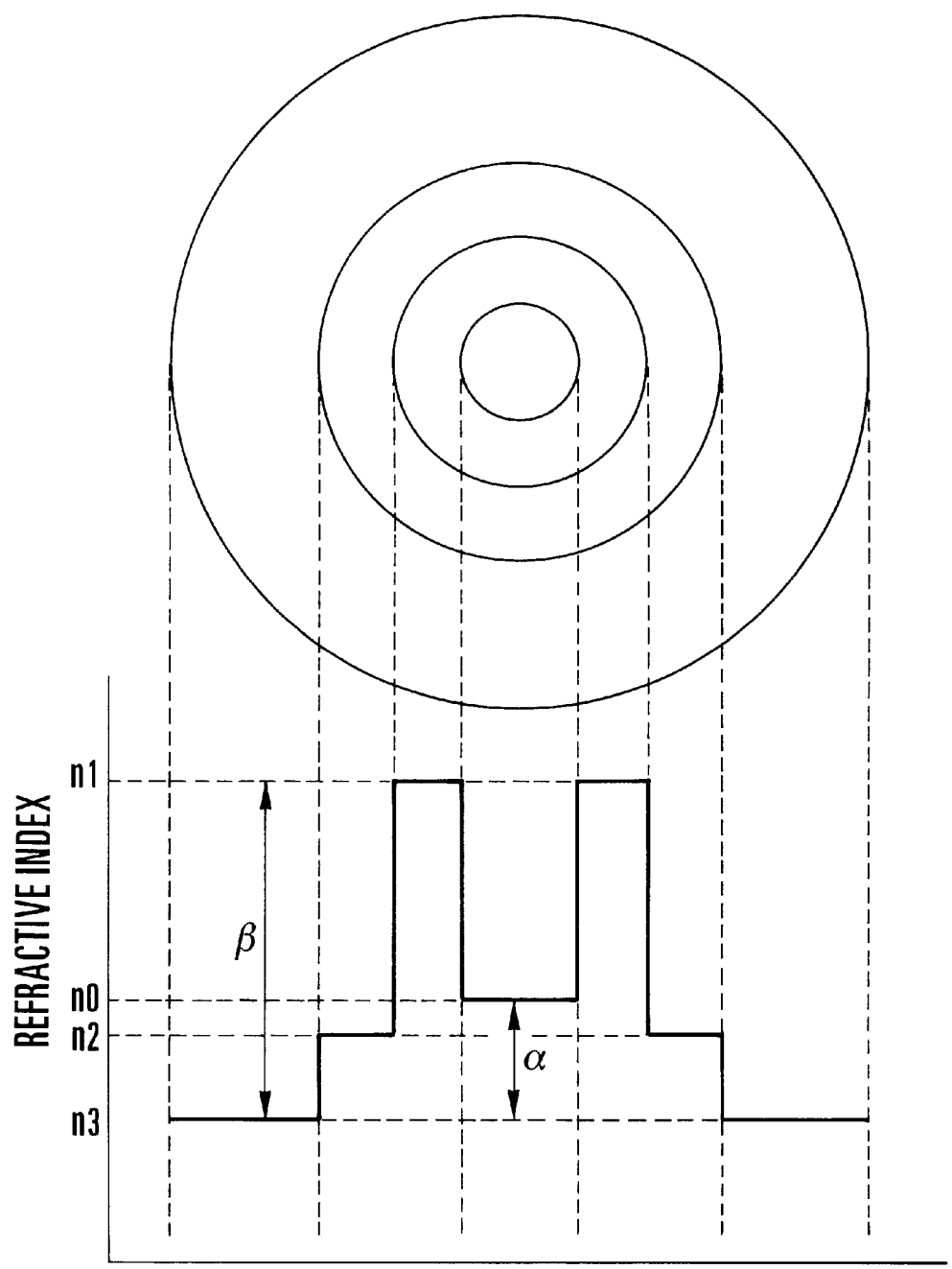
FIG. 7 is a view showing the section of an optical nonlinearity suppressing fiber according to the present invention and its index distribution.

FIG. 7 shows the section of the optical nonlinearity enhancing fiber and its index distribution. As shown in FIG. 7, the refractive index $n_0$ of the core is made higher than the refractive index $n_3$ of the third cladding and lower than the refractive index $n_1$ of the first cladding to strengthen the light confinement effect at the center of the optical fiber, and the Aeff is reduced, thereby inducing the optical nonlinear effects (i.e., $n_1 > n_2 > n_3$, and $n_1 > n_0 > n_3$). With this arrangement, the intensity of light in the optical fiber becomes high. The optical nonlinear effects occur in accordance with the product of the intensity of light (power) and the nonlinear length, so this optical fiber can induce the optical nonlinear effects at a high efficiency.

Examples of the present invention will be described next.

Figure 8A:
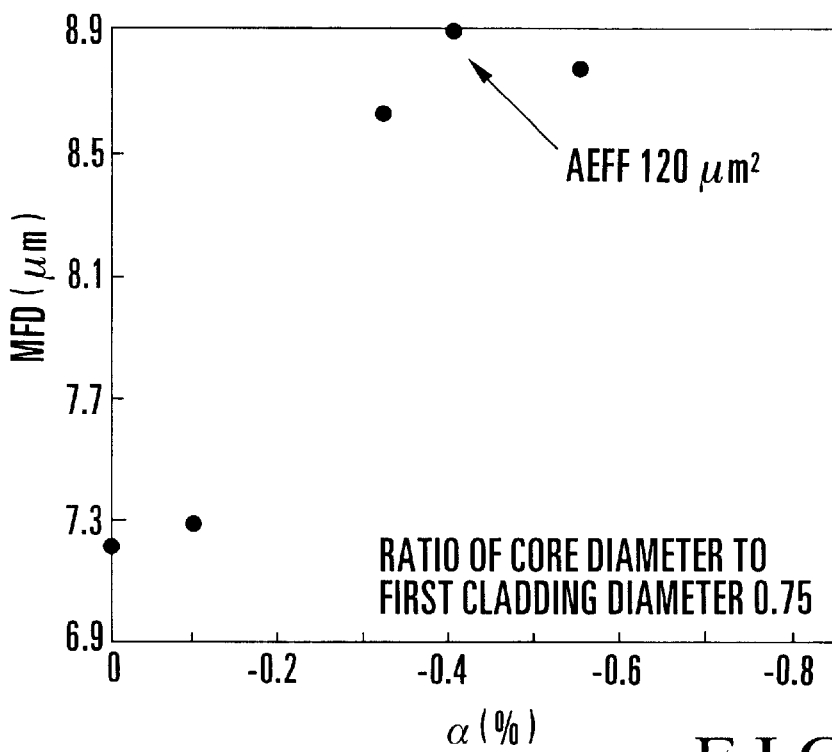
FIGS. 8A and 8B are graphs showing the relationship between the MFD and the relative index difference α between/the core and the third cladding.
Figure 8B:
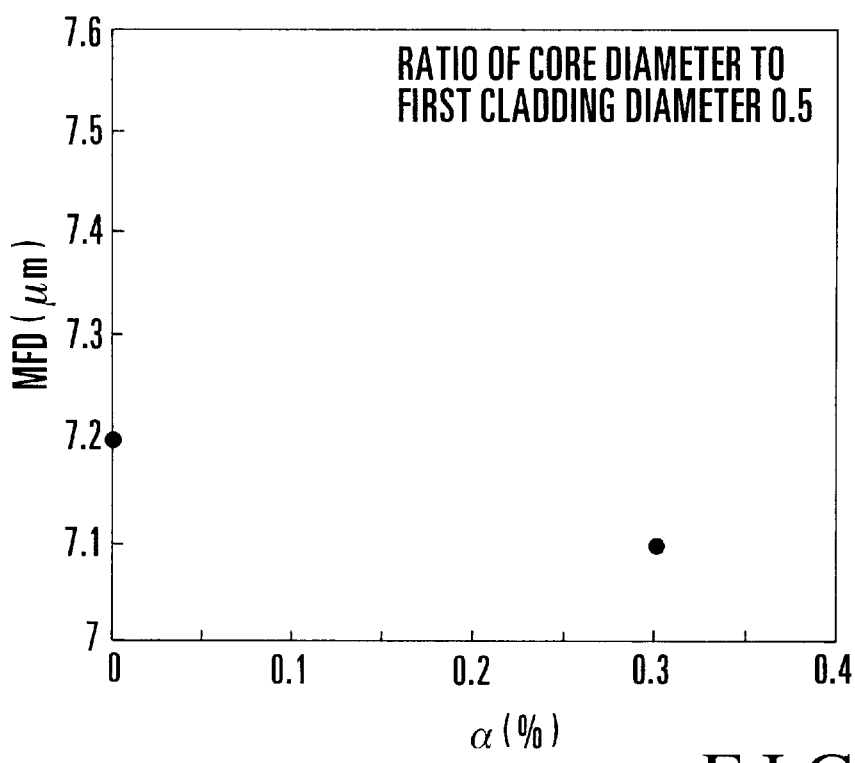

FIGS. 8A and 8B show a change in mode field diameter (to be referred to as an MFD hereinafter) when the relative index difference α between the core and the third cladding is changed.

The MFD is a parameter indicating the extension of field distribution of light in the fiber and is known to be proportional to the Aeff (Namihira et al., "Nonlinear Kerr Coefficient Measurements for Dispersion Shifted Fibers using Self-Phase Modulation Method at 1.55 μm", OEC '94).

As shown in FIG. 8A, when the absolute value of the relative index difference α is increased in the negative direction, the field distribution of light spreads to lower the intensity, so the optical fiber of this embodiment becomes the optical nonlinearity suppressing fiber for suppressing the optical nonlinear effects. From the viewpoint of manufacturing, the dose of fluorine which is doped to lower the refractive index of the core is limited, so the relative index difference α has its lower limit value within the range of −0.7% to −0.8% in fact.

On the other hand, as shown in FIG. 8B, when the relative index difference α is increased to the positive direction, the value of MFD becomes small. MFD of a general dual-shaped dispersion shifted fiber is effectively about 7.4 to 8.4 μm (Aeff=41 to 53 μm$^2$). With the relative index difference α having a positive value, the field distribution becomes narrower than that of the DSF, and the intensity of light rises, so the optical nonlinearity enhancing fiber is obtained.

If the electric field has a Gaussian distribution, Aeff=π× (MFD/2)$^2$ is obtained. When MFD increases, the Aeff also increases. However, if the optical fiber of the present invention is formed as the optical nonlinearity suppressing fiber (i.e., α<0), the field distribution deviates from the Gaussian distribution, so the right-hand side of the above equation must be multiplied by a correction coefficient c (c>1).

Figure 9:
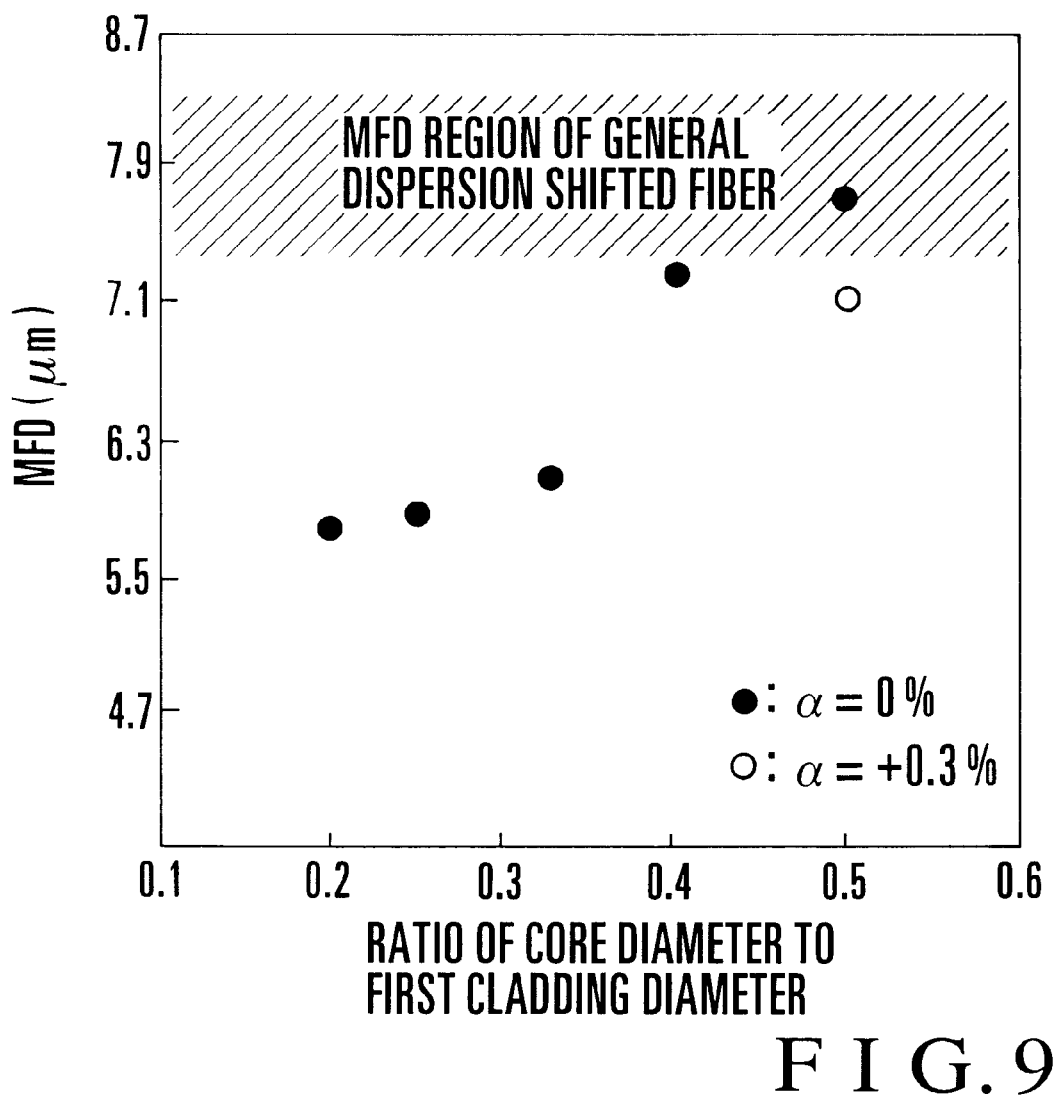
FIG. 9 is a graph showing the relationship between the MFD and the ratio of the core diameter to the first cladding diameter.

FIG. 9 shows a change in MFD observed when the ratio of the core diameter to the first cladding diameter is changed. In FIG. 9, a bullet indicates a value when the relative index difference α between the core and third cladding is 0%; and a hollow bullet, a value when the relative index difference α is +0.3%. As shown in FIG. 9, when the relative index difference α is 0%, and the ratio of the core diameter to the first cladding diameter is 0.4 or less, MFD becomes smaller than that of the DSF. Since the intensity of light rises, the optical nonlinearity enhancing fiber is obtained. When the relative index difference α is +0.3%, and the ratio of the core diameter to the first cladding diameter is 0.5 or less, the optical nonlinearity enhancing fiber is expected to be obtained.

The FWM suppressing effect will be described next.

FIG. 10 shows the FWM suppressing effect. As is apparent from FIG. 10, FWM can be suppressed by changing chromatic dispersion along the longitudinal direction of the optical fiber.

FIG. 10 shows the dependence of the FWM generation efficiency (normalized by defining the generation efficiency for a dispersion variation of 0 as 1) in a chromatic-dispersion varying fiber (length: 40 km), whose chromatic dispersion linearly increases along the longitudinal direction of the optical fiber, on the chromatic dispersion variation (chromatic dispersion difference between the input side and output side) (FIG. 11).

When the chromatic dispersion variation is 4 ps/nm/km, the FWM generation efficiency is 1/10 that of the normal optical fiber whose chromatic dispersion variation is 0, or less, so a sufficient suppressing effect can be obtained. The suppressing effect can be increased by increasing the chromatic dispersion variation. In addition, as is apparent from FIG. 10, the FWM generation efficiency can be suppressed to about 0.03 with a chromatic dispersion variation of 20 ps/nm/km. For a chromatic dispersion variation of 24 ps/nm/km, a larger FWM suppressing effect is expected.

FIG. 12 shows the relationship between the core diameter for satisfying the single-mode condition and the relative index difference β between the first and third claddings when the relative index difference a between the core and the third cladding is changed. The hatched portion in FIG. 12 indicates a region where the single-mode condition cannot be satisfied at 1.55 μm. As the relative index difference a becomes small, the number of combinations of the core diameter and relative index difference β for satisfying the single-mode condition increases.

Figure 13:
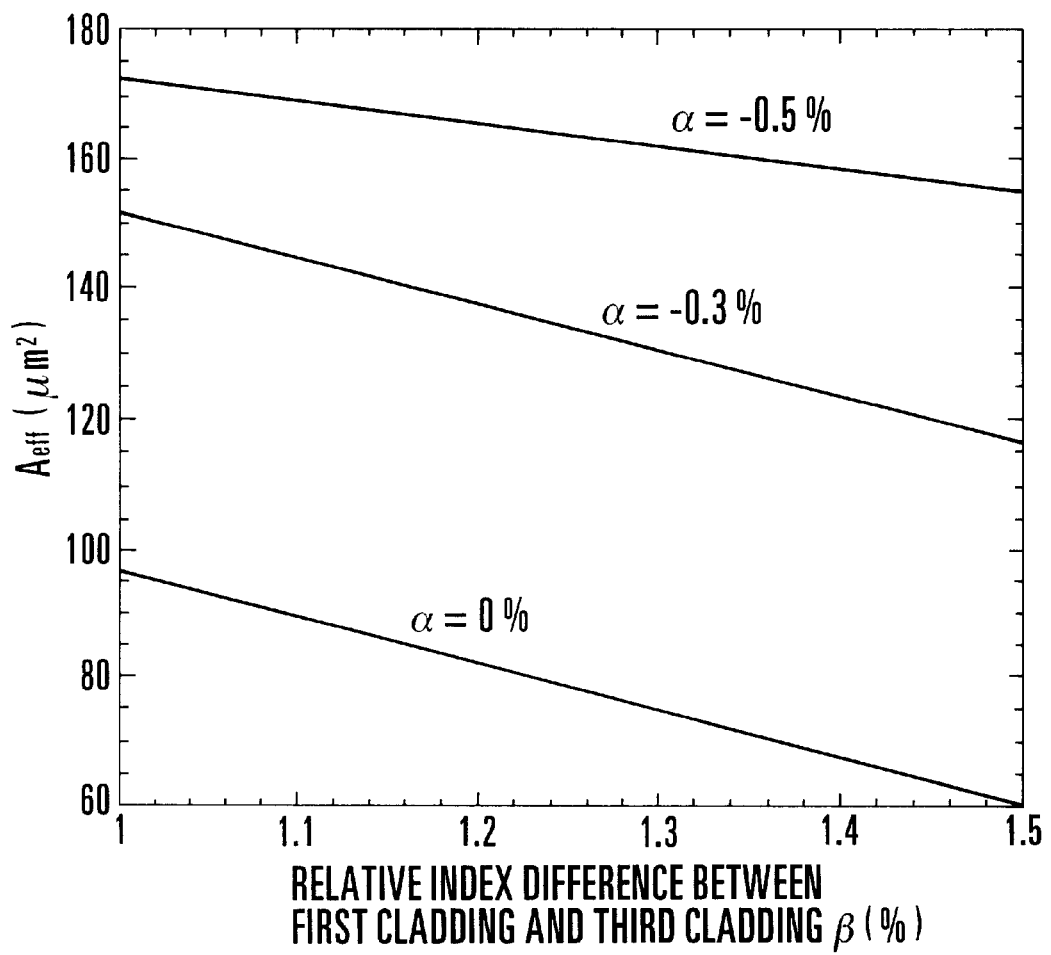
FIG. 13 is a graph showing the relationship between the Aeff and the relative index difference β between the first cladding and the third cladding.

In an optical fiber shown in FIG. 13, the Aeff could be increased to about 150 μm² at a zero-dispersion wavelength of 1.55 μm by setting the relative index difference α at about −0.3% and relative index difference β at about 1%. FIG. 14 shows a change in zero-dispersion wavelength when each relative index difference is changed while maintaining the index relationships $n_1 > n_2 > n_3$ and $n_1 > n_0$. As is apparent from FIG. 14, zero dispersion in the wavelength band of 1.4 to 1.5 μm is realized. By changing the combination of relative index differences, zero dispersion in the wavelength band of 1.3 to 1.6 μm or in a longer wavelength band can also be realized.

Considering the handling characteristics of the above-described optical fiber in actual use for a transmission line or the like, the optical fiber must have a small bending loss. The optical fiber of this embodiment could improve its bending loss characteristics by increasing the relative index difference β. FIG. 15 shows the bending loss characteristics with respect to the bending radius of the optical fiber of this embodiment. As is apparent from FIG. 15, the bending loss decreases as the relative index difference β increases. In addition, the optical fiber of this embodiment can obtain almost the same bending loss characteristics as those of the conventional DSF (about several dB/m for a bending radius of 1 cm; Aeff is about 50 μm²) by setting the relative index difference β at about 1.5%. In this case, the Aeff is about 120 μm².

According to the optical fiber of the present invention, even when the zero-dispersion wavelength is designed in a band of 1.55 μm, the field distribution does not concentrate to the center of the optical fiber. For this reason, the Aeff can be made larger than that of the conventional DSF by twice or more while maintaining almost the same bending loss characteristics. More specifically, the intensity of light lowers to suppress the optical nonlinear effects, and consequently, degradation in signal waveform is suppressed, so the bit rate and transmission distance can be increased.

In addition, when the phase matching condition between wavelengths is disturbed by changing the zero-dispersion wavelength in a band of 1.55 μm along the longitudinal direction of the optical fiber, the FWM generation efficiency can be lowered. Therefore, the wavelength interval in WDM can be reduced to increase the number of channels.

On the other hand, when the Aeff is decreased, the intensity of light in the optical fiber can be made high. Since the optical nonlinear effects can be efficiently generated, an optical fiber suitable for an optical switch or wavelength conversion device can be provided.

What is claimed is:

1. An optical fiber comprising:
   a core having a refractive index $n_0$;
   a first cladding formed around said core and having a refractive index $n_1$;
   a second cladding formed around said first cladding and having a refractive index $n_2$; and
   a third cladding formed around said second cladding and having a refractive index $n_3$,
   wherein the refractive indices have relationships $n_1 > n_2 > n_3$ and $n_1 > n_0$.

2. A fiber according to claim 1, wherein the refractive indices further have a relationship $n_3 \geq n_0$.

3. A fiber according to claim 2, wherein a diameter of said second cladding continuously changes along a longitudinal direction of said optical fiber.

4. A fiber according to claim 3, wherein the diameter of said second cladding monotonically increases along the longitudinal direction of said optical fiber.

5. A fiber according to claim 3, wherein the diameter of said second cladding monotonically decreases along the longitudinal direction of said optical fiber.

6. A fiber according to claim 2, wherein a relative index difference β between said first cladding and said third cladding continuously changes along a longitudinal direction of said optical fiber.

7. A fiber according to claim 6, wherein the relative index difference β between said first cladding and said third cladding monotonically increases or monotonically decreases along the longitudinal direction of said optical fiber.

8. A fiber according to claim 2, wherein a relative index difference α between said core and said third cladding continuously changes along a longitudinal direction of said optical fiber.

9. A fiber according to claim 8, wherein the relative index difference α between said core and said third cladding monotonically increases or monotonically decreases along the longitudinal direction of said optical fiber.

10. A fiber according to claim 1, wherein the refractive indices further have a relationship $n_0 > n_3$.

11. A fiber according to claim 10, wherein a diameter of said second cladding continuously changes along a longitudinal direction of said optical fiber.

12. A fiber according to claim 11, wherein the diameter of said second cladding monotonically increases along the longitudinal direction of said optical fiber.

13. A fiber according to claim 11, wherein the diameter of said second cladding monotonically decreases along the longitudinal direction of said optical fiber.

14. A fiber according to claim 10, wherein a relative index difference $\alpha$ between said core and said third cladding continuously changes along a longitudinal direction of said optical fiber.

15. A fiber according to claim 14, wherein the relative index difference $\alpha$ between said core and said third cladding monotonically increases or monotonically decreases along the longitudinal direction of said optical fiber.

16. A fiber according to claim 10, wherein a relative index difference $\beta$ between said first cladding and said third cladding continuously changes along a longitudinal direction of said optical fiber.

17. A fiber according to claim 16, wherein the relative index difference $\beta$ between said first cladding and said third cladding monotonically increases or monotonically decreases along the longitudinal direction of said optical fiber.

* * * * *

UNITED STATES PATENT AND TRADEMARK OFFICE
CERTIFICATE OF CORRECTION

PATENT NO. : 5,963,700
DATED : October 5, 1999
INVENTOR(S) : Kata et al.

It is certified that error appears in the above-identified patent and that said Letters Patent is hereby corrected as shown below:

On the Title Page:

In [56], line 14, delete "ECOC +96" and insert -- ECOC '96 --.

In [56], line 23, delete "Nov. 1996" and insert -- Nov. 1993 --.

In [56], line 24, delete "Measurement for Dispersion Shifted Fibers using Self-Phase Modulation Method; 1.55μ"" and insert -- Measurements for Dispersion Shifted Fibers using Self-Phase Modulation Method; 1.55μm" --.

In column 1, line 61, delete "core diameter, n" and insert -- core diameter $n_1$ --.

In column 3, line 48, delete "bet n a core" and insert -- between a core --.

In column 4, line 3, delete "between/the core" and insert -- between the core --.

In column 6, line 58, delete "index difference a" and insert -- index difference $\alpha$ --.

In column 7, line 41, delete "index difference a" and insert -- index difference $\alpha$ --.

In column 7, line 44, delete "index difference a" and insert -- index difference $\alpha$ --.

Signed and Sealed this

Twenty-seventh Day of March, 2001

*Attest:*

NICHOLAS P. GODICI

*Attesting Officer*      *Acting Director of the United States Patent and Trademark Office*

UNITED STATES PATENT AND TRADEMARK OFFICE
CERTIFICATE OF CORRECTION

PATENT NO. : 5,963,700
DATED : October 5, 1999
INVENTOR(S) : Kato et al.

It is certified that error appears in the above-identified patent and that said Letters Patent is hereby corrected as shown below:

Item [56],
Line 14, delete "ECOC +96" and insert --ECOC '96--.
Line 23, delete "Nov. 1996" and insert --Nov. 1993--.
Line 24, delete "Measurement for Dispersion Shifted Fibers using Self-Phase Modulation Method; 1.55μ"" and insert --Measurements for Dispersion Shifted Fibers using Self-Phase Modulation Method; 1.55μm"--.

Column 1,
Line 61, delete "core diameter, n" and insert --core diameter $n_1$ --.

Column 3,
Line 48, delete "bet n a core" and insert --between a core --.

Column 4,
Line 3, delete "between/the core" and insert --between the core --.

Column 6,
Line 58, delete "index difference a" and insert --index difference $\alpha$ --.

UNITED STATES PATENT AND TRADEMARK OFFICE
CERTIFICATE OF CORRECTION

PATENT NO.   : 5,963,700
DATED        : October 5, 1999
INVENTOR(S)  : Kato et al.

It is certified that error appears in the above-identified patent and that said Letters Patent is hereby corrected as shown below:

Column 7,
Line 41, delete "index difference a" and insert --index difference $\alpha$ --.
Line 44, delete "index difference a" and insert -- index difference $\alpha$ --.

This certificate supercedes certificate of correction issued March 27, 2001.

Signed and Sealed this

Twenty-sixth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 5,963,700
DATED : October 5, 1999
INVENTOR(S) : Kato et al.

It is certified that error appears in the above-identified patent and that said Letters Patent is hereby corrected as shown below:

Title page,
Line 14, delete "ECOC +96" and insert -- ECOC '96 --.
Line 23, delete "Nov. 1996" and insert -- Nov. 1993 --.
Line 24, delete "Measurement for Dispersion Shifted Fibers using Self-Phase Modulation Method; 1.55μ"" and insert -- Measurements for Dispersion Shifted Fibers using Self-Phase Modulation Method; 1.55μ" --.

Column 1,
Line 61, delete "core diameter, n" and insert -- core diameter $n_1$ --.

Column 3,
Line 48, delete "bet n a core" and insert -- between a core --.

Column 4,
Line 3, delete "between/the core" and insert -- between the core --.

Column 6,
Line 58, delete "index difference a" and insert -- index difference $\alpha$ --.

Column 7,
Lines 41 and 44, delete "index difference a" and insert -- index difference $\alpha$ --.

This certificate supercedes Certificate of Correction issued March 27, 2001.

Signed and Sealed this

Twelfth Day of March, 2002

*Attest:*

JAMES E. ROGAN
*Attesting Officer*     *Director of the United States Patent and Trademark Office*